R. C. ROOT.
VENTILATING APPARATUS.
APPLICATION FILED AUG. 15, 1917.
1,301,975.
Patented Apr. 29, 1919.
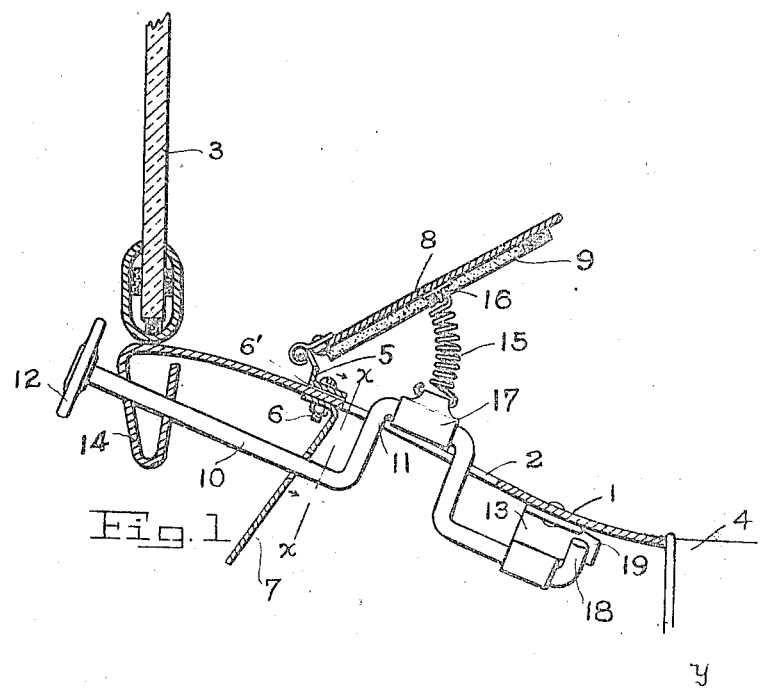
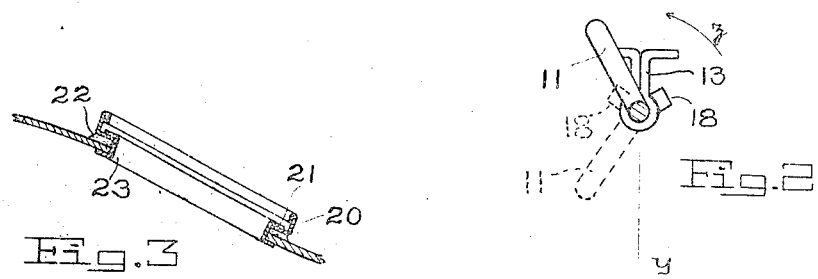
INVENTOR.
Ralph C. Root
BY William P. Ballard
ATTORNEY

UNITED STATES PATENT OFFICE.

RALPH C. ROOT, OF INDIANAPOLIS, INDIANA.

VENTILATING APPARATUS.

1,301,975.   Specification of Letters Patent.   Patented Apr. 29, 1919.

Application filed August 15, 1917.  Serial No. 186,284.

*To all whom it may concern:*

Be it known that I, RALPH C. ROOT, residing at Indianapolis, in the county of Marion and State of Indiana, have invented certain Improvements in Ventilating Apparatus, of which the following is a specification.

This invention relates to ventilating apparatus and is particularly adapted to the ventilation of automobile bodies. It is well known that the floors and inclosed space in automobiles particularly forward of the front seat, become so heated from the engine and exhaust pipe as to be highly uncomfortable in warm weather. It is the object of the present invention to provide a ventilator for the relief of this condition which will be efficient, simple, inexpensive and easily operated. The invention will be more fully understood by reference to the accompanying drawing in which Figure 1 is a sectional view showing the ventilator applied to an automobile cowl, Fig. 2 is a cross sectional view on the line $x$—$x$ of Fig. 1 and Fig. 3 is a fragmentary sectional view corresponding to Fig. 1 and showing a modification.

In Fig. 1 a longitudinal central section of a cowl dash is represented at 1. An opening 2 is provided at a convenient point, preferably about midway between the windshield 3 and the engine hood 4 and on the central line of the car. The opening may be of any shape but it will be found convenient and effective to have it rectangular with the longer dimension across the car.

In the preferred form of my invention an upstanding ledge 5 extends along the upper edge of the opening to prevent water falling on the windshield and upper part of the cowl from entering. This may be made in the form of a strip of L shaped cross section as shown, one limb of which is held against the outer surface of the cowl by bolts 6. A thin packing 6' may advantageously be introduced under this limb to insure a tight joint. The same bolts also serve to hold in place a deflector 7 extending downward and somewhat backward from the rear edge of the opening for causing the incoming rush of air to circulate toward the floor of the car.

A shutter 8 is pivoted on projections integral with, or otherwise secured to, the upper edge of the ledge 5 as shown, and is provided on its under side with a heavy packing 9 of felt rubber or the like for the purpose of completing the water tight seal on the three sides of the opening not protected by the ledge 5 and to prevent rattling when the shutter is in closed position.

The opening and closing of the shutter is accomplished by means of the shaft 10 having a cranked portion 11 and a handle 12. The shaft is pivoted at one end in a depending bracket 13 secured to the forward under side of the cowl, and at the other end in the downwardly extending portion 14 of the cowl itself. The crank portion of the shaft is preferably located directly under the shutter, to which it is attached by a helical spring 15. At the upper end this spring passes snugly through an eye 16 secured in any convenient manner to the under side of the shutter, and at the lower end it is secured in the sleeve 17 rotatably mounted on the crank. This end of the spring fits closely in an elongated passage extending from front to back in the sleeve 17 as shown, and the length and direction of this passage and of the sleeve 17 itself are such as to tend to throw the upper end of the spring forward of the eye 16 in the open position of the shutter, so that when connected to the eye 16 it is required to bend backward in a curve as indicated on the drawing. Thus when the shutter is open all of the joints in the connection and in the hinge are put under tension by the spring and rattling is effectually prevented.

In order to avoid accidental closing of the shutter, crank 11 is arranged to pass the dead center in the open position. This is illustrated more clearly in Fig. 2 which is a somewhat diagrammatic representation laid out around the axis of the shaft as a center. The vertical dead center line through the axis of the shaft being indicated at $y$—$y$. In opening the shutter the crank is rotated in the direction of the arrow $z$ until it passes the center line $y$—$y$ and is arrested by the right angular projection 18 on the shaft coming against the stop 19 on the bracket 13 (Fig. 1). In the closed position of the shutter the crank likewise passes the lowest position before being brought to rest by the projection 18 hitting the stop 19 on the other side, as indicated in Fig. 2 in dotted lines.

Fig. 3 shows a modification in which the entire margin of the opening in the cowl is provided with an upstanding ledge 20 the inwardly extending base 21 of which is seated against a packing 22 of rubber, leather or the like and held in place by a metal strip 23 of U shaped cross section, extending around the opening and having its opposite edges forced together under pressure against the base 21 and the cowl body, respectively, to hold the ledge in place. In using this modification, the packing on the under side of the shutter seats against the upstanding flange 20, a lighter packing on the shutter being then usually sufficient however.

The operation of the device will now be readily understood. To open the shutter the handle 12 is rotated in a counter-clockwise direction which forces the shutter up due to the lifting action of the crank on the helical spring. The handle is turned until brought to rest by the stop 19 as above described when the crank will have passed the dead center so that the weight of the shutter, spring and of the crank itself serves to keep the crank from rotating in the reverse direction thus avoiding closure of the shutter by accident, the flexing of the spring serving at the same time to prevent rattling as above described.

To close the shutter the handle is rotated in a clockwise direction. This first lifts the crank over the upper dead center and then pulls the shutter down against the cowl, this position being reached when the crank is little more than halfway down. Further movement of the crank stretches the spring forcing the packing 9 firmly against its seat to make a perfect seal and finally the crank, passing the lower dead center, is held securely in place by the tension of the spring between it and the shutter as will be clear from a consideration of Fig. 2.

It will be seen from the foregoing that I have provided a very simple and inexpensive device for the purpose intended in which a single spring serves the fourfold purpose of elevating and holding open the shutter, preventing rattling, compressing the packing to effect a tight closure, and securing the crank in closed position. It will also be seen that the device can readily and instantly be manipulated with one hand which is a distinct advantage over devices requiring two hands for their operation. Various modifications in the details here shown and described may obviously be made without departing from the scope and spirit of my invention as defined in the appended claims.

What I claim is:

1. The combination with a compartment having an opening in its wall, of a hinged shutter therefor, an operating mechanism for said cover having a member movable toward and away from said shutter and an extensible spring connection between said shutter and said member arranged to be extended beyond its normal length in the closed position of said shutter.

2. The combination with a compartment having an opening in its wall, of a hinged shutter therefor, an operating mechanism for said shutter having a member movable toward and away from said shutter, and a resilient connection between said shutter and said member arranged to be bent laterally by the opening movement of the mechanism whereby rattling of the shutter is prevented.

3. The combination with a compartment having an opening in its wall, of a hinged shutter therefor, an operating mechanism for said shutter including a resilient member distorted from normal form both in the open and in the closed position of the shutter, whereby the shutter is urged against the wall in closed position and prevented from rattling in open position.

4. The combination with a compartment having an opening in its wall, of a hinged shutter therefor, an operating mechanism for said shutter having a member movable in a non-rectilinear path and passing its position of maximum opening and of complete closure at the respective ends of its excursion, and a resilient element connecting said member and said shutter and distorted from its normal form by the movement of the mechanism when said member is at either end of its excursion, whereby the shutter is urged against the wall in closed position and is prevented from rattling in open position.

5. The combination with a compartment having an opening in its wall, of a hinged shutter therefor, an operating mechanism for said shutter including a crank movable toward and away from said shutter, and a spiral spring connecting the shutter and the crank.

6. The combination with a compartment having an opening in its wall, of a hinged shutter therefor, an operating mechanism for said shutter including a crank movable toward and away from said shutter, and a spiral spring connecting the shutter and the crank, the connections at either end of the spring being such as to cause a lateral distortion thereof in the open position of the shutter.

7. The combination with a compartment having an air inlet in its upper wall, of an upwardly opening shutter for closing said inlet, a shaft pivoted to rotate under said wall and having an eccentric portion underlying said shutter, a member longitudinally and laterally resilient connecting said eccentric portion and said shutter for causing the latter to open and close as the shaft is rotated and means for arresting the rotation of the shaft in one direction shortly after it has passed the point of maximum opening and in the other direction shortly after the eccentric portion is farthest removed from the connection to the shutter, the throw of the eccentric portion being sufficient to distort said member from its normal condition when the shutter is closed.

8. The combination with a compartment having an air inlet in its wall of an outwardly opening shutter pivoted at one side of said inlet, a shaft supported in bearings adjacent said wall and having an eccentric portion opposite the shutter, stops limiting the rotation of the shaft in either direction shortly after the eccentric portion has passed the points in its orbit nearest and farthest from the shutter respectively, a resilient member joining the eccentric portion and the shutter whereby the latter may be opened and closed by rotation of the shaft, the connections of the resilient member being arranged to distort said member as the shutter opens.

9. In combination with a compartment having an air inlet in its wall, an outwardly opening shutter pivoted at one side of said inlet, shutter operating mechanism within said compartment including an element moving in a plane perpendicular to the shutter in closed position and a resilient member joining said element and said shutter, the connections of said resilient member to said element and shutter being such as to distort said member by reason of the angular movement of the shutter as it opens.

10. In combination with an automobile having a sloping cowl with an opening in its upper surface, an upstanding ledge extending along the rear edge of the opening to prevent the entrance of water a shutter pivoted to said ledge and packing secured to the under side of the shutter in a position to prevent the entrance of water on the other edges of the opening when the shutter is in closed position.

11. In combination with an automobile having a sloping cowl with an opening in its upper surface, an upstanding ledge extending along the rear edge of the opening to prevent the entrance of water, a shutter pivoted to said ledge, a deflector depending within the cowl from the rear edge of the opening and means extending through portions of the ledge, cowl and deflector for holding the ledge and deflector in place.

In testimony whereof, I have signed my name to this specification this 8th day of August, 1917.

RALPH C. ROOT.